W. McFISHBACK.
Harrow.

No. 57,166.  Patented Aug. 14, 1866.

Witnesses:
Jos. L. Coombs
M. Bailey

Inventor:
W. McFishback
by
A. Pollok

UNITED STATES PATENT OFFICE.

WILLIAM McFISHBACK, OF UNION, OHIO, ASSIGNOR TO HIMSELF AND ERASMUS TUCKER.

IMPROVEMENT IN HARROWS.

Specification forming part of Letters Patent No. 57,166, dated August 14, 1866.

*To all whom it may concern:*

Be it known that I, WILLIAM McFISHBACK, of Union, in the county of Montgomery and State of Ohio, have invented certain new and useful Improvements in Harrows; and I hereby declare the following to be a full, clear, and exact description of the same, reference being had to the accompanying drawings, in which—

Figure 1:
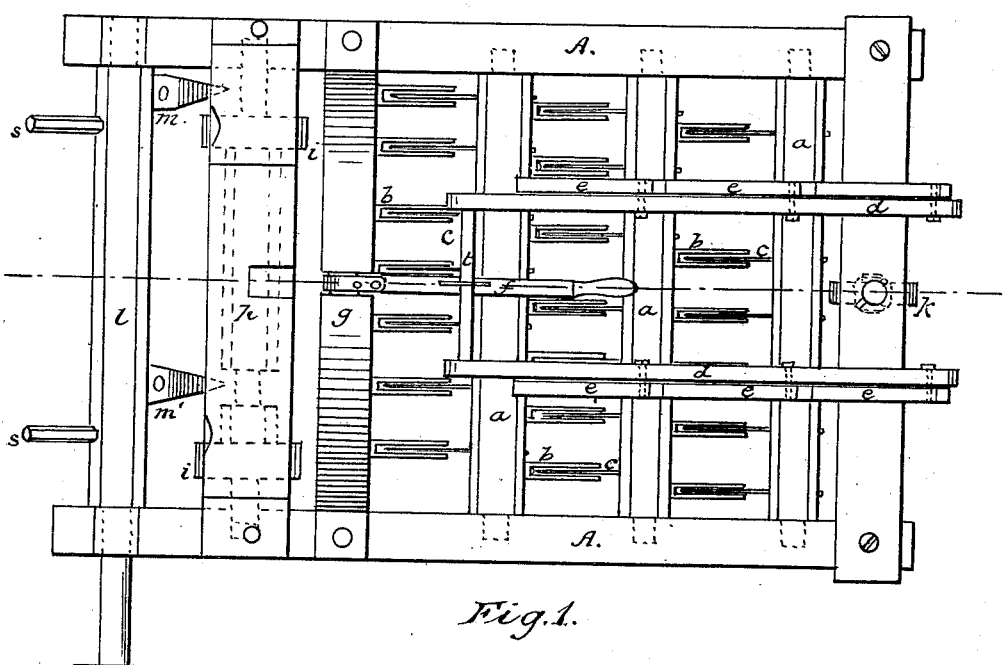
Figure 2:
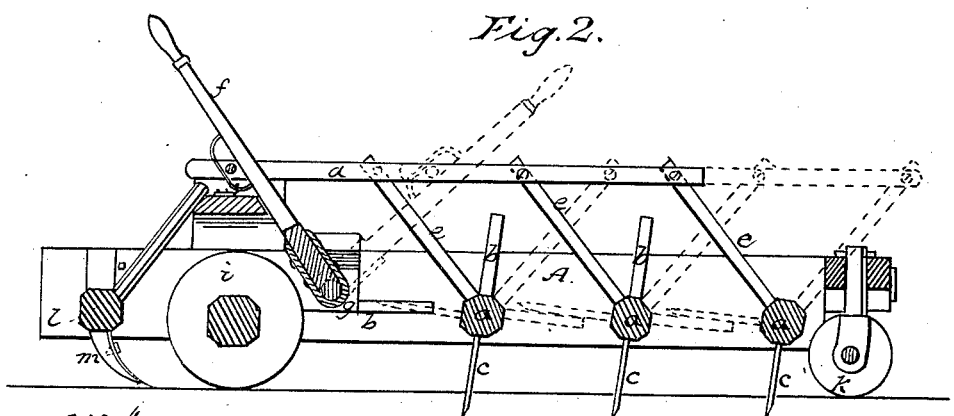

Figure 1 represents in plan, and Fig. 2 in section, a machine constructed in accordance with my invention.

My invention relates to that class of harrows in which the teeth are fixed in rocker-shafts, the shafts being so connected by means of suitable frame-work and lever, or other device, that the harrow-teeth may be simultaneously set for work, or removed from contact with the earth, at the pleasure of the operator; and the object of my invention is to produce a machine of this class, so arranged that the work may be performed with greater ease, less expenditure of power, and more effectively than by the machines of a like nature now in use.

The improvements which I have made the subject of this application consist essentially, first, in the arrangement, as hereinafter explained, of the cleaners, whose function it is to free the harrow-teeth from the dirt, sticks, and other refuse matter which gather around them when the harrow is in motion, and thus clog and impede the working of the machine; second, in the combination, with the teeth and cleaners thus arranged, of the wheels upon which, when the harrow-teeth are not in use, the machine may entirely rest, and which, even when the teeth are set for use, prevent them from sinking too deep in the soil, and thus effect a saving in the power needed to work the machine; and, third, in combining with the harrow thus constructed a device for making furrows for corn, the said device consisting of a rocker-shaft secured to the frame of the harrow in rear of the shafts in which the harrow-teeth are set and provided with shovels or small plows which mark the furrows for corn-planting. This shaft extends out beyond one side of the frame, and upon this extended end is placed what I call a "guide," by means of which, as hereinafter explained, the harrow may be accurately guided and furrows marked at the requisite distances from each other. By this combination of the harrow and markers I am enabled to both harrow and mark the ground with less labor than it usually takes to harrow it.

To enable others to understand and use my invention, I will now proceed to describe it by reference to the drawings.

Within the frame A of the harrow are the rocker-shafts $a$, which carry the harrow-teeth and cleaners. These shafts extend across the harrow at right angles to its length, and have their bearings in the sides of the frame A. The teeth $c$ are secured in the shafts $a$ by any ordinary means, and are so placed as to stand in a quincunx order—that is, the teeth of one shaft are so placed as to be opposite the interval between the two nearest teeth on the next adjoining shaft.

Upon the sides of each shaft, opposite the teeth, are secured the cleaners $b$. These cleaners are made of iron or steel, and are secured to the shaft in such position as to be opposite the intervals between the teeth of the same shaft, as shown in the drawings. By this arrangement the cleaners on each shaft—as, for instance, the middle shaft, $a$, Fig. 1, shown in the drawings—are so placed in relation to the teeth of the beam next in front that each tooth will pass between the jaws of its corresponding cleaner whenever the rocker-shafts are vibrated so as to throw back the teeth, as hereinafter explained.

Each cleaner is made from a strip of iron or steel, which is so bent that the distance between the sides thus formed shall be just sufficient to allow a harrow-tooth to pass through. The cleaner is secured by its rear to the rocker-shaft by means of a bolt, as shown in the drawings, and the lower edges of the jaws, or that part of the cleaner which first comes in contact with the refuse which gathers around the teeth, may be made sharp, so as to more readily clean the teeth and rid them of obstructions.

Above the rocker-shafts $a$ is the frame-work by means of which the shafts are moved simultaneously. This frame-work consists of uprights or levers $e$, which extend from each shaft on each side of the harrow. They are pivoted at their upper ends to the horizontal pieces or coupling-bars $d$, and these latter are in turn connected together at their rear ends by a cross-piece, $t$.

A lever, $f$, is secured to the middle of the cross-beam $g$, which extends across from one side to the other of the frame A. This lever is connected with the cross-bar $t$ in any suitable manner, so that it may move backward and forward freely, and thus actuate the framework and rocker-shafts $a$. In the front part of the cross-beam $g$ are secured stationary cleaners, so arranged that the teeth of the rear rocker-bar may pass through the same whenever necessary.

When the lever $f$ is drawn back to the position shown in Fig. 2 it rests in a recess formed for its reception in the cross-beam $h$, which is just in rear of the piece $g$. When the lever is in this position the harrow-teeth are set for work, and to prevent the lever from being drawn forward by the resistance offered to the teeth by the ground it is held in place on the piece $h$ by means of an iron bar or any other suitable device.

Under the cross-piece $h$ are placed the two wheels $i$, which revolve on the shaft or axle $w$, which is supported in the sides A of the frame of the harrow. Under the center of the front part of the frame A there is also another wheel, which is held in place and secured to the frame in the manner shown in the drawings, or in any other suitable manner, so that it can be turned in any direction. These wheels have broad treads to keep them from sinking too deep in the earth, and are of such size that the teeth, when set for work, will extend down some distance below them.

Behind the wheels, and supported in the sides of the frame, is what I call a "corn-marker," consisting of a rocker-shaft, $l$, provided with two shovels, $m$ $m'$. The bar extends through one side of the frame, and on this extended end is secured a guide, $n$, as hereinafter explained. The rocker-shaft is so secured to the frame A as to be removable at pleasure. These shovels $m$ $m'$ and guide $n$ are so arranged that the distance between the shovels $m$ $m'$ is equal to the distance between the shovel $m'$ and the guide $n$, while the two latter are equidistant from the side A of the frame which lies between them. The reasons for this disposition of the teeth and guide will be explained hereinafter. When the shovels and guide are in position for work they will occupy the position shown in Fig. 2, the handles $s$, by which the bar is vibrated, resting against the cross-piece $h$, and thus supporting the shovel-teeth against the resistance offered by the earth. When the device is not required for work it may be thrown back in the position shown in Fig. 1.

The machine thus constructed is operated as follows: When it is desired to take the machine to the field where it is to be employed, the lever $f$ is thrown forward to the position shown in Fig. 1 and in red lines in Fig. 2. By this means, and through the intermediary of the frame-work, with which the lever is connected, the shafts $a$ are vibrated so as to throw the teeth $c$ back and upward until they have a horizontal position, as shown in the drawings. The cleaners $b$ are, of course, similarly moved, so that the teeth $c$ of one shaft and the cleaners $b$ of the next adjoining shaft in rear lie in the same plane, each tooth being between the jaws or sides of its corresponding cleaner. The shovel-teeth $m$ and guide $n$ of the corn-marker are likewise thrown upward, and the whole weight of the harrow rests on the wheels $i$ and $k$. The harrow may thus be drawn to the field like any ordinary wagon.

After arriving at the place of work, in order to set the teeth for use the lever-handle $f$ is drawn back to the position shown in black lines in Fig. 2, and is secured in this position to the cross-beam $h$ by a strong iron bar or other suitable device for preventing the lever from being drawn forward. By this means the rocker-shafts $a$ are vibrated so as to bring the teeth $c$ in a vertical position. The rocker-shaft $l$ of the corn-marker is also rotated until the handles $s$ shall rest against the rear of the cross-beam $h$. Now, when the machine is put in motion, the teeth $c$ extend far enough below the wheels $i$ and $k$ to enter the ground some distance, while they are prevented from being buried too deep in the earth by the broad tread of the wheels. By this arrangement the ground is thoroughly broken with much less trouble and expenditure of labor than by any ordinary machine in use.

If at any time the teeth become clogged they may be cleaned without stopping the machine, it being only necessary to throw forward the lever $f$, and thus force the teeth through the cleaners, which immediately rid the teeth of all obstructions. After this has been done the teeth are again brought into a vertical position by drawing back the lever and securing it in its former place; and the same thing may be done when stones or other obstructions are to be avoided.

The shovel-teeth $m$ $m'$, in the rear of the machine, mark the furrows. Now, when the machine has reached the end of the field it is turned to the right, and in coming back it is so placed that the guide $n$ shall strike in the furrow made by the shovel $m'$ in going down the field. By this means the distances between the furrows are always made equal, because, as above said, the distance between the shovels $m$ $m'$ is equal to that between the shovel $m'$ and the guide $n$, and, as the two latter are equidistant from the side A of the frame, which lies between them, it will be seen that in coming back, by thus following with the guide the furrow made by the shovel $m'$ in going down, no portion of the ground escapes the harrow. When the machine has arrived at the point it started from it is turned to the left and the shovel $m$ is placed in the same furrow made by it in coming back, and thus it will be seen that after the first round—that is, going down the field and returning—three furrows are made in each round, four furrows having been made during the first round.

Having thus described my improvements, and the manner in which the same are or may be carried into effect, what I claim and desire to secure by Letters Patent, is—

1. The arrangement, in the plane of a harrow-frame, of two or more rock-shafts, each being provided with teeth and cleaners, as described, in combination with coupling-bars and levers for vibrating said shafts simultaneously, the whole being arranged for operation as shown and described, so that the teeth of the one shaft may be cleared by the cleaners of the next succeeding shaft.

2. In combination with the rock-shafts provided with teeth and cleaners, as described, the stationary cleaners attached to the cross-beam in rear of the rocker-shafts, for the purpose of clearing the teeth of the rear rock-shaft, as herein shown and set forth.

3. The cleaners constructed as herein described—that is to say, each cleaner being formed of one continuous piece of metal which is bent to form the jaws between which the harrow-tooth passes, the rear end of the cleaner forming the base by which the same is secured in its position.

4. In combination with a harrow-frame having a vibratory or rocker frame provided with teeth and cleaners, as above set forth, the wheels mounted in said frame on a fixed axle in the manner and for the purposes herein shown and set forth.

5. In combination with a harrow constructed as set forth, the hereinbefore-described device for marking furrows—that is to say, the rock-shaft provided with shovel-teeth and guide, arranged and operating as and for the purposes herein shown and specified.

In testimony whereof I have signed my name to this specification before two subscribing witnesses.

WILLIAM McFISHBACK.

Witnesses:
WILKISON SCHAFFER,
Dr. L. W. KEPLER.